(12) United States Patent
Hu et al.

(10) Patent No.: US 6,647,165 B2
(45) Date of Patent: Nov. 11, 2003

(54) TOTAL INTERNAL REFLECTION OPTICAL SWITCH UTILIZING A MOVING DROPLET

(75) Inventors: Gongjian Hu, San Jose, CA (US); Peter Robrish, San Francisco, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 155 days.

(21) Appl. No.: 09/871,486

(22) Filed: May 31, 2001

(65) Prior Publication Data

US 2002/0181835 A1 Dec. 5, 2002

(51) Int. Cl.[7] .................................................. G02B 6/26
(52) U.S. Cl. .............................. 385/16; 385/19; 385/21
(58) Field of Search ...................................... 385/16–23

(56) References Cited

U.S. PATENT DOCUMENTS

| | | | | |
|---|---|---|---|---|
| 4,384,761 A | * | 5/1983 | Brady et al. ................... | 385/23 |
| 4,505,539 A | * | 3/1985 | Auracher et al. .............. | 385/19 |
| 4,988,157 A | | 1/1991 | Jackel et al. | |
| 5,204,921 A | | 4/1993 | Kanai et al. | |
| 5,699,462 A | | 12/1997 | Fouquet et al. | |
| 5,732,168 A | * | 3/1998 | Donald ......................... | 385/16 |
| 6,072,924 A | | 6/2000 | Sato et al. | |
| 6,195,478 B1 | | 2/2001 | Fouquet | |

FOREIGN PATENT DOCUMENTS

| | | | | |
|---|---|---|---|---|
| DE | 0203409 | * | 10/1983 | ................... 385/19 |
| EP | 0938013 A2 | | 8/1999 | |
| EP | 1111419 A1 | | 6/2001 | |

OTHER PUBLICATIONS

Syklarov, O.K., "A Two–Position Lightguide Optical Switch", 1298 Telecommunications and Radio Engineering, 48(1993), Jul., No. 7, New York, pp. 1–3.

* cited by examiner

*Primary Examiner*—Hung N. Ngo

(57) ABSTRACT

An optical switch constructed from first and second waveguides. The first and second waveguides have ends disposed across a gap such that light traversing the first waveguide enters the second waveguide when the gap is filled with a liquid having a first index of refraction, whereas light traversing the first waveguide is reflected by the gap when the gap is filled with a material having a second index of refraction that is substantially different from the first index of refraction. The gap is part of a trench that contains a liquid droplet made from a droplet material having the first index of refraction. The droplet is located in the trench and is movable between the first and second positions in the trench, the droplet filling the gap in the first position. The gap is filled with a material having the second index of refraction when the droplet is in the second position. The droplet may be moved using an electric field generated by a plurality of electrodes arranged such that an electrical potential applied between a first pair of the electrodes creates an electric field in a region of the trench containing the first position. The droplet can also be moved by differentially heating two edges of the droplet so as to create a net force on the droplet in a direction parallel to the direction of the trench. The heating can be accomplished by illuminating one edge of the droplet with light of a wavelength that is absorbed by the droplet material.

11 Claims, 6 Drawing Sheets

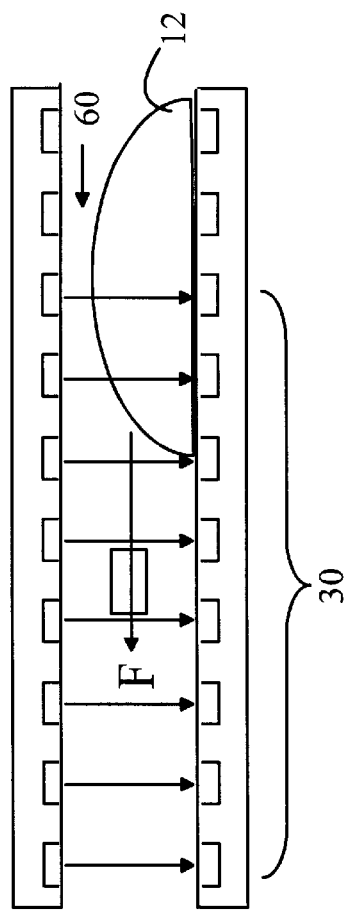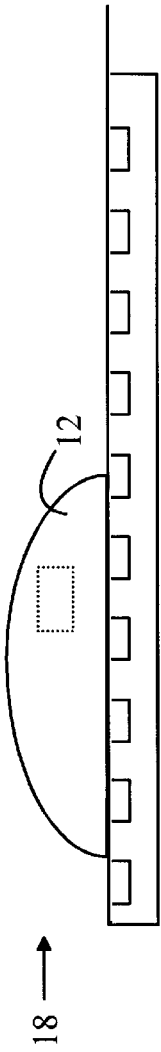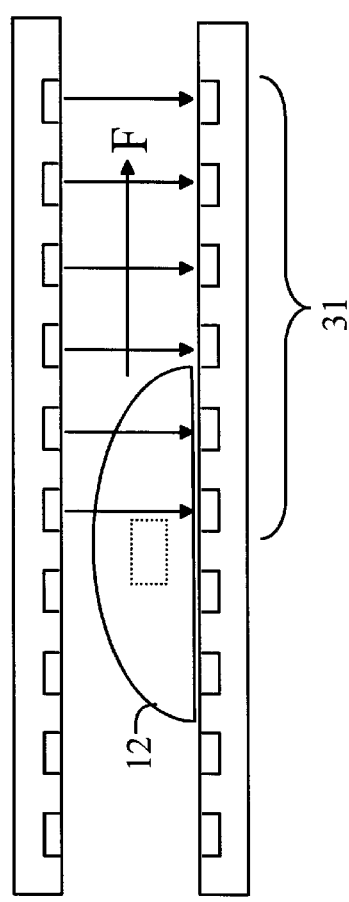

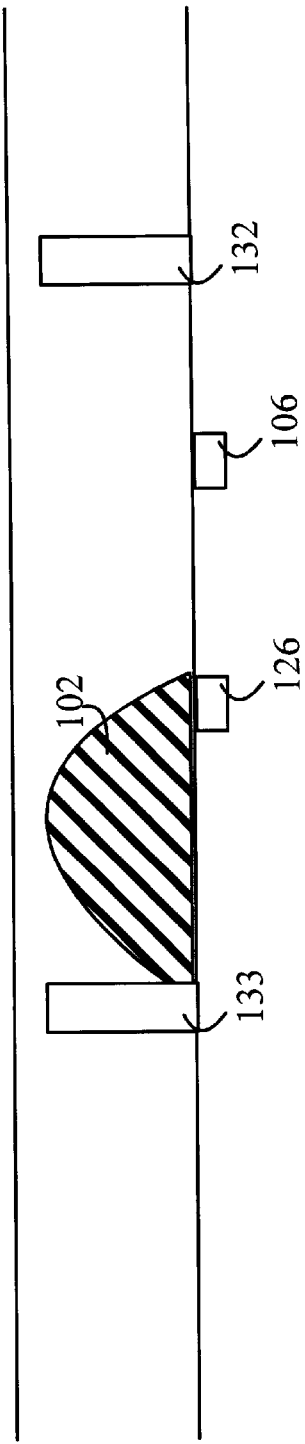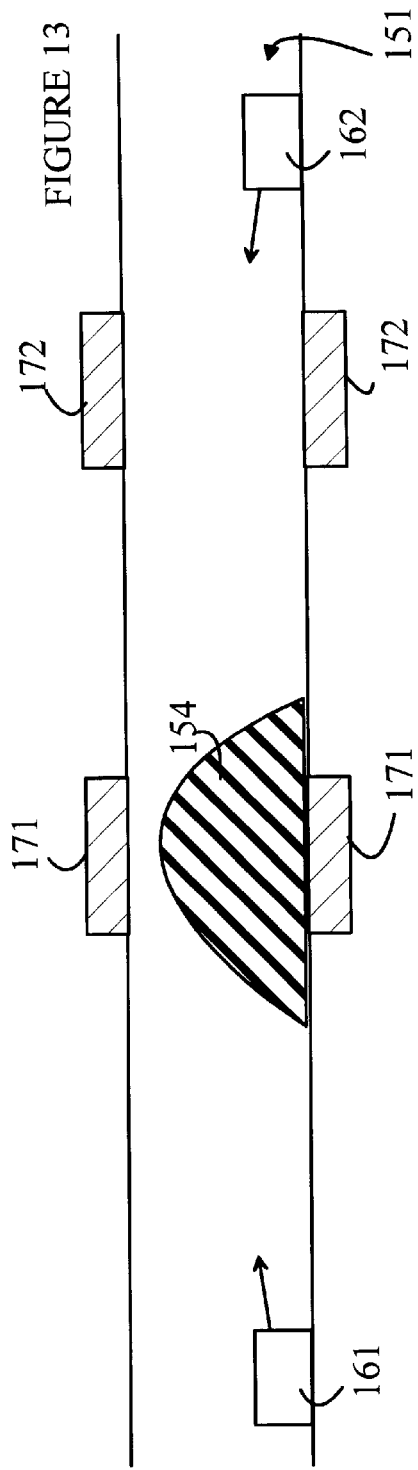

TOTAL INTERNAL REFLECTION OPTICAL SWITCH UTILIZING A MOVING DROPLET

FIELD OF THE INVENTION

The present invention relates to optical switches, and more particularly, to an improved cross-point switching element.

BACKGROUND OF THE INVENTION

Optical fibers provide significantly higher data rates than electronic paths. However, effective utilization of the greater bandwidth inherent in optical signal paths requires optical cross-connect switches. In a typical telecommunications environment, the switching of signals between optical fibers utilizes an electrical cross-connect switch. The optical signals are first converted to electrical signals. After the electrical signals have been switched, the signals are again converted back to optical signals that are transmitted via the optical fibers. To achieve high throughput, the electrical cross-connect switches utilize highly parallel, and highly costly, switching arrangements. However, even with such parallel architectures, the cross-connect switches remain a bottleneck.

A number of optical cross-connect switches have been proposed; however, none of these has successfully filled the need for an inexpensive, reliable, optical cross-connect switch. One class of optical cross-connects depends on wavelength division multiplexing (WDM) to effect the switching. However, this type of system requires that the optical signals being switched have different wavelengths. In systems where the light signals are all at the same wavelength, this type of system requires the signals to be converted to the desired wavelength, switched, and then be re-converted to the original wavelength. This conversion process complicates the system and increases the cost.

A second type of optical cross-connect utilizes total internal reflection (TIR) switching elements. A TIR element consists of a waveguide with a switchable boundary. Light strikes the boundary at an angle. In the first state, the boundary separates two regions having substantially different indices of refraction. In this state, the incident angle is greater than the critical angle of TIR, the light is reflected off of the boundary and thus changes direction. In the second state, the two regions separated by the boundary have the same index of refraction and the light continues in a straight line through the boundary. The critical angle of TIR depends on the difference in the index of refraction of the two regions. To obtain a large change in direction, the region behind the boundary must be switchable between an index of refraction equal to that of the waveguide and an index of refraction that is markedly smaller than that of the waveguide.

One class of prior art TIR elements that provide a large change in index of refraction operates by mechanically changing the material behind the boundary. For example, U.S. Pat. No. 5,204,921, Kanai, et al. describes an optical cross-connect based on an array of cross-points in a waveguide. A groove at each cross-point may be switched "on" or "off," depending upon whether the groove is filled with an index-matching oil. The index-matching oil has a refractive index close to that of the waveguides. An optical signal transmitted through a waveguide is transmitted through the cross-point when the groove is filled with the matching oil, but the signal changes its direction at the cross-point through total internal reflection when the groove is empty. To change the cross-point switching arrangement, grooves must be filled or emptied. In the system taught in this patent, a "robot" fills and empties the grooves. This type of switch is too slow for many applications of interest.

A faster version of this type of TIR element is taught in U.S. Pat. No. 5,699,462, which is hereby incorporated by reference. The TIR taught in this patent utilizes thermal activation to displace liquid from a gap at the intersection of a first optical waveguide and a second optical waveguide. In this type of TIR element, a trench is cut through a waveguide. The trench is filled with an index-matching liquid. A bubble is generated at the cross-point by heating the index matching liquid with a localized heater. The bubble must be removed from the cross-point to switch the cross-point from the reflecting to the transmitting state and thus change the direction of the output optical signal.

Switches based on a gas-vapor transition have a number of problems. First, substantial amounts of power are required to generate the bubble by vaporizing the index matching liquid. Second, to maintain a vapor bubble at a cross-point, a large temperature gradient must be maintained. This temperature gradient induces thermal stress and reduces the working temperature range of the device. Third, these switches depend on power being present at all times. If power is removed from the device, all cross-points will eventually enter the transmitting state.

Broadly, it is the object of the present invention to provide an improved cross-point for use in cross-connect switches and the like.

It is a further object of the present invention to provide a cross-point that does not require the high temperature gradients and high power input of the prior art devices discussed above.

It is a still further object of the present invention to provide a cross-point that maintains its state if power is removed from the cross-point.

These and other objects of the present invention will become apparent to those skilled in the art from the following detailed description of the invention and the accompanying drawings.

SUMMARY OF THE INVENTION

The present invention is an optical switch constructed from first and second waveguides. The first and second waveguides have ends disposed across a gap such that light traversing the first waveguide enters the second waveguide when the gap is filled with a liquid having a first index of refraction, whereas light traversing the first waveguide is reflected by the gap when the gap is filled with a material having a second index of refraction that is substantially different from the first index of refraction. The gap is part of a trench that contains a liquid droplet made from a droplet material having the first index of refraction. The droplet is located in the trench and is movable between the first and second positions in the trench, the droplet filling the gap in the first position. The gap is filled with a material having the second index of refraction when the droplet is in the second position. The droplet may be moved using an electric field generated by a plurality of electrodes arranged such that an electrical potential applied between a first pair of the electrodes creates an electric field in a region of the trench containing the first position. The droplet can also be moved by differentially heating two edges of the droplet so as to create a net force on the droplet in a direction parallel to the direction of the trench. The heating can be accomplished by illuminating one edge of the droplet with light of a wavelength that is absorbed by the droplet material.

BRIEF DESCRIPTION OF THE DRAWINGS

FIGS. 6–8 are cross-sectional views of the waveguide through line 51–52 as shown in FIG. 4.

FIG. 12 is a cross-sectional view of the trench in another embodiment of the present invention.

FIG. 13 is a cross-sectional view of the trench 151 of another embodiment of the present invention.

DETAILED DESCRIPTION OF THE INVENTION

Figure 2:
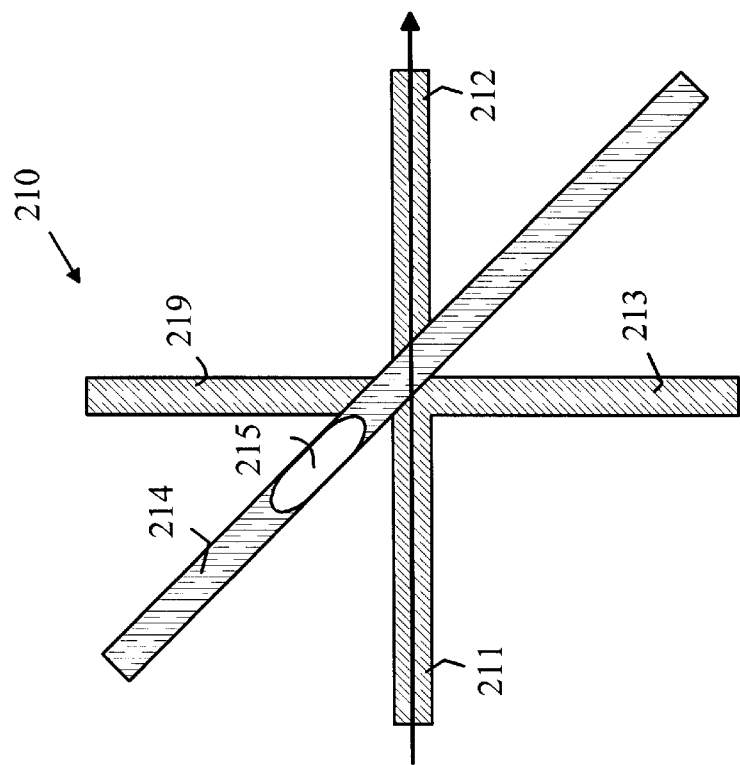
FIGS. 1 and 2 are top views of a prior art cross-point switching element 10 having two states.
Figure 1:
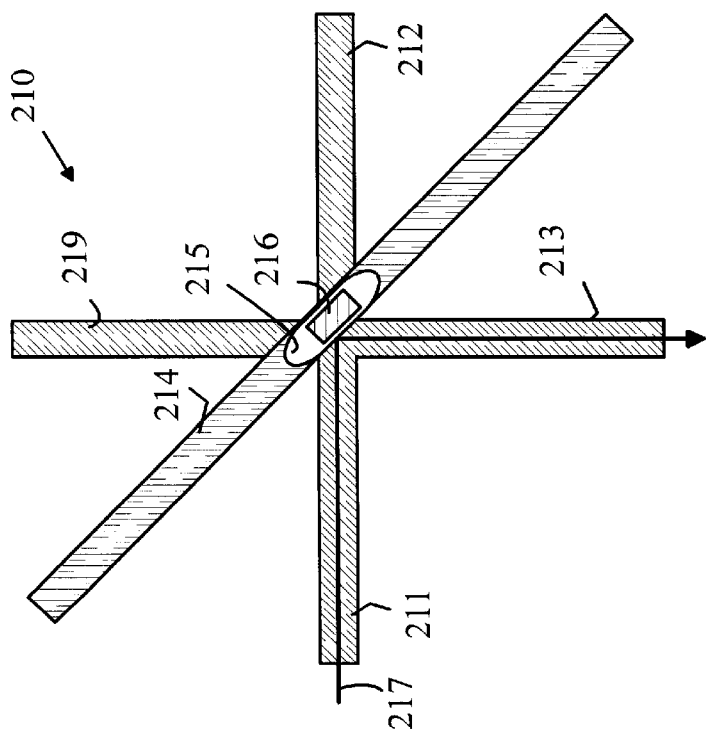

The present invention may be more easily understood with reference to FIGS. 1 and 2, which are top views of a prior art cross-point switching element 210 having two states. Switching element 210 is constructed from three waveguides 211–213 that are fabricated in a planar lightwave circuit on top of a substrate. The substrate is preferably a silica, but other materials, such as silicon, may be used. The waveguides are defined by two cladding layers and a core layer. To simplify the drawing, the individual layers have been omitted. The fabrication of such waveguides in silica is well known to the art, and hence will not be discussed in detail here. For example, Hitachi Cable and Photonic Integration Research, Inc. in Columbus, Ohio have demonstrated waveguides in $SiO_2$ on silica and silicon substrates. The core is primarily $SiO_2$ doped with another material, such as Ge or $TiO_2$. The cladding material is $SiO_2$, doped with another material such as $B_2O_3$ and/or $P_2O_5$. Because the core material has a refractive index that is different from the refractive index of the cladding layers, optical signals will be guided along waveguides 211–213.

A trench 214 is etched through the waveguide and preferably into the silicon substrate. Trench 214 is positioned such that a light signal travelling down waveguide 211 will be reflected into waveguide 213 if the index of refraction of the material filling trench 214 is substantially different from the index of refraction of the waveguides as shown in FIG. 1. This state of the switching element will be referred to as the "reflecting" state. If, however, the intersection of the trench and the waveguides is filled with a material having an index of refraction that matches that of the core of the waveguides, the light signal will pass through trench 214 and exit via waveguide 212 as shown in FIG. 2. This state of the switching element will be referred to as the "transmitting" state.

The angle at which waveguides 211 and 213 intersect trench 214 depends on the difference in the index of refraction between the waveguide material and the material used to create the reflecting state in the trench. The angles of incidence of the waveguides and the position of the trench are chosen such that light incident on the trench wall from waveguide 211 is totally reflected into waveguide 213. This angle is typically between 53 and 75 degrees with respect to the normal direction of the trench wall.

When the trench is filled with the index matching material, light traveling down a fourth waveguide 219 will pass into waveguide 213. Waveguide 219 is used to construct cross-connect switches utilizing a two-dimensional array of cross-point switching elements. An array of this type is typically constructed as a plurality of rows and columns of cross-point switching elements. The rows and columns are connected via row and column waveguides. The cross-connect switch connects the signals input on the row waveguides to the column waveguides. The specific switching pattern depends on the state of the switching elements.

In these simple cross-connect switches, at any given time there is, at most, one switching element in each column that switches light from a row waveguide into a column waveguide. The light switched into the column waveguide is transmitted to the end of the column through switching elements that are in the non-reflecting state. Waveguide 219 allows light switched by a switching element above element 10 in the array to be transmitted to the next switching element in the column below it so that the light can eventually exit from the last switching element in the column.

As noted above, the index matching material may be displaced from the intersection by forming a bubble 215 at the intersection with the aid of a heating element 216. Heating element 216 draws power both to vaporize the index matching liquid and to maintain the bubble during the time the cross-point is to remain in the reflective state.

The present invention overcomes these problems by utilizing a dielectric droplet of index matching liquid that is moved in the trench by applying electric fields to the droplet. When the fields are removed, the droplet remains at its last position, and hence, the cross-point will maintain its state even if power is removed. In addition, the power consumption of the device is substantially lower than vapor-based bubble systems, since the power source does not have to vaporize the index matching liquid.

Figure 3:
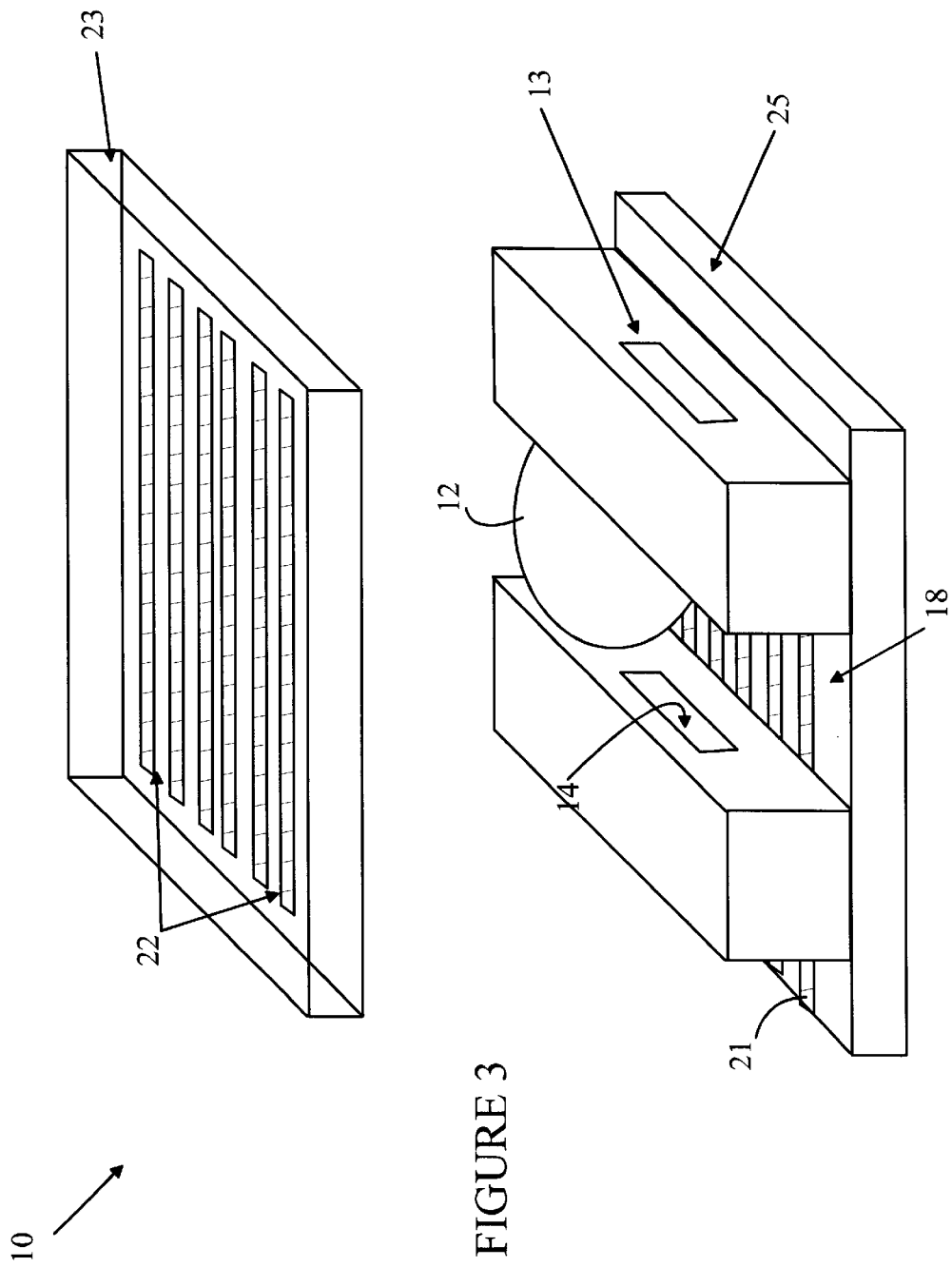
FIG. 3 is a partially exploded perspective view of a portion of a cross-point 10 according to the present invention.
Figures 4, 5:
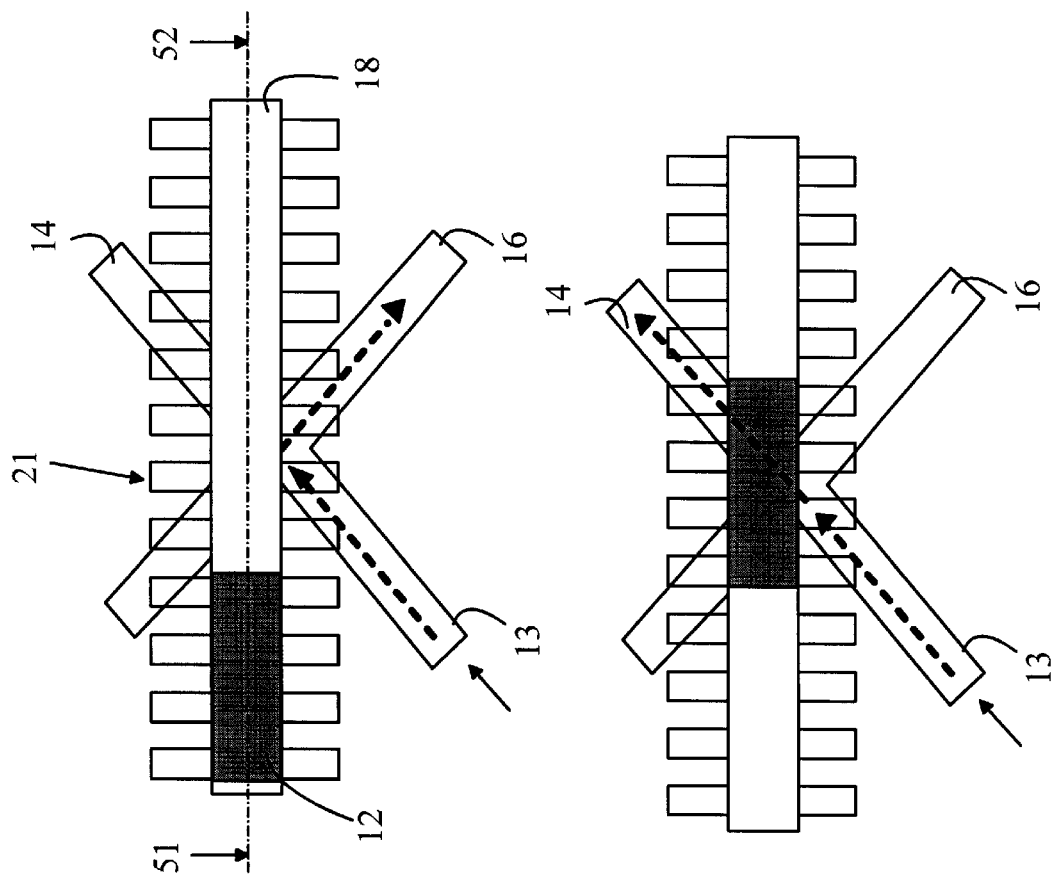
FIG. 4 is a top view of a cross-point according to the present invention in the reflecting state.
FIG. 5 is a top view of a cross-point according to the present invention in the transmitting state.

Refer now to FIGS. 3–5. FIG. 3 is a partially exploded perspective view of a portion of a cross-point 10 according to the present invention. FIGS. 4 and 5 are top views of a cross-point according to the present invention in the reflecting and transmitting states, respectively. The present invention is based on the observation that a droplet of dielectric will move into an electric field. In the present invention, a dielectric droplet 12 is confined to a trench 18. In the transmitting state, the droplet is moved such that it covers the waveguide 13 as shown in FIG. 5. The index of refraction of the droplet is chosen to match that of the waveguide, and hence, light will pass from waveguide 13 to waveguide 14. When the droplet is moved away from the waveguide as shown in FIG. 4, the interface between the gas in the trench and the waveguide causes light in the waveguide to be reflected down waveguide 16.

The droplet is moved by applying an AC electric field across a portion of the droplet. The electric field is generated by applying the appropriate potentials across selected one of the electrodes 22 that are deposited on the top of trench cover 23 and the electrodes 21 on the bottom of the trench. In principle, a DC electric field can be utilized to move the droplet if the droplet is constructed from a perfect dielectric. Unfortunately, most of the materials that can be used for the droplet have sufficient conductivity to allow ions to move within the droplet. If a DC field is used, these ions will migrate to the surface of the droplet and shield the droplet from the electric field. Hence, an AC field that has a polarity that changes in a time that is short compared to the time needed for ions or other carriers to migrate a significant distance within the droplet must be used. In the preferred embodiment of the present invention, a field with a frequency greater than 1 kHz is utilized.

Refer now to FIGS. 6–8, which are cross-sectional views of the waveguide through line 51–52 shown in FIG. 4. FIG. 6 illustrates the field pattern used to move droplet 12 into a position at which it causes the waveguide to be transmitting. The droplet is initially to the right of the waveguide. By applying a potential difference across the top and bottom electrodes in the region shown at 30, the droplet will experience a force that tends to move the droplet to the left. Once the droplet has moved such that it matches the index across the trench, the electric potentials are removed from the electrodes and the cross-point will remain in the transmitting state as shown in FIG. 7. To move the droplet away from the waveguide, and hence, place the cross-point in the reflecting state, the electrodes shown at 31 in FIG. 8 are energized thereby applying a force that moves the droplet to the right. Once the droplet has moved away from the waveguide, the potential across the electrodes is removed, and the cross-point will remain in the reflecting state.

In the preferred embodiment of the present invention, the electrodes are energized in sequence as the droplet moves such that approximately half of the droplet is subjected to the electric field. This arrangement maximizes the force on the droplet, and hence, the speed of the droplet. Once the droplet has moved to the desired final position, the electrodes around the desired position are energized until the droplet's motion ceases. These electrodes are shown at 30 in FIG. 6.

A cross-connect switch can be constructed from an array of cross-points in which a number of the cross-points share the same trench. In this case, it is advantageous to isolate the operation of the cross-points that share a trench. If droplet 12 fills the trench, then its motion will compress the gas on one side of the droplet and reduce the gas pressure on the other side. This pressure differential can cause a droplet in the same trench to move even in the absence of an electric field on that droplet. In addition, the pressure differential inhibits the motion of the droplet, and hence, larger electric fields are needed to move the droplet.

The present invention avoids these problems by including an air gap above the droplet as shown at 60 in FIG. 6. This provides an air passage that prevents a pressure differential from forming across the droplet when the droplet moves.

Figure 9:
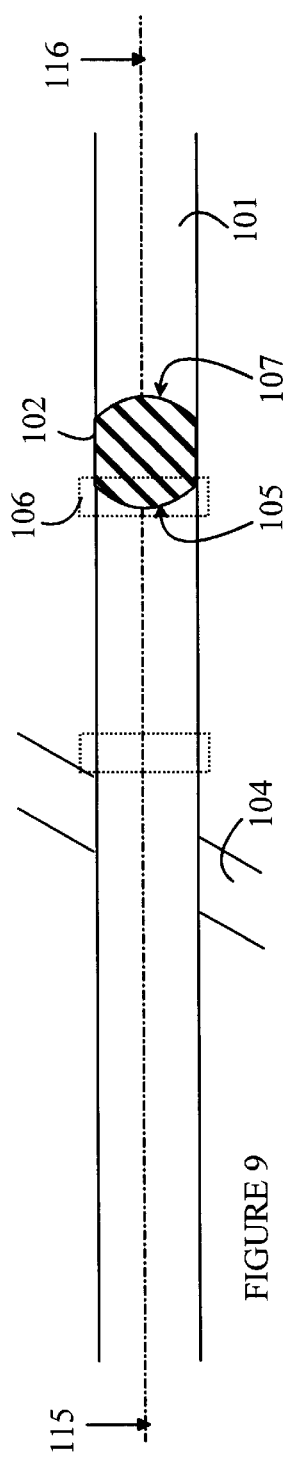
FIG. 9 is a top cross-sectional view of a trench 101 containing a droplet 102 that moves to match the index of refraction across the gap in waveguide 104.
Figure 10:
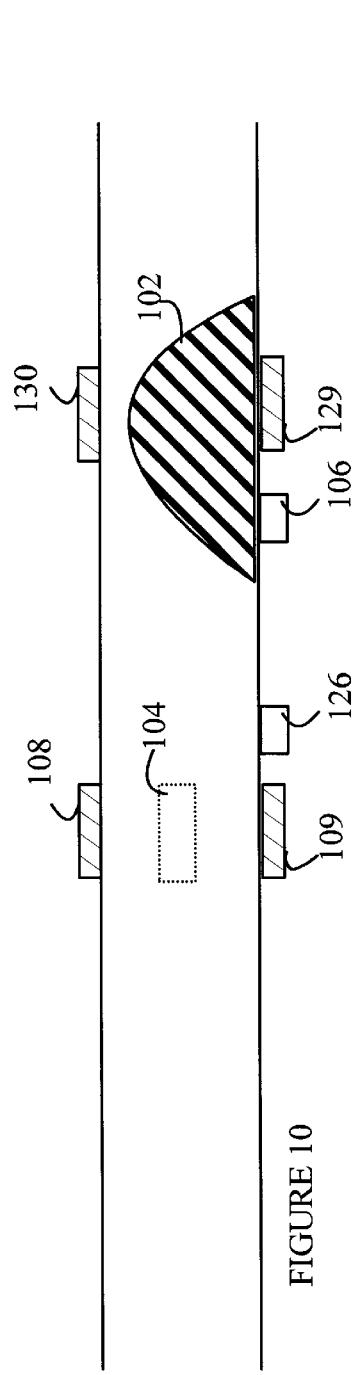
FIGS. 10 and 11 are side cross-sectional views of trench 101 through line 115–116.
Figure 11:
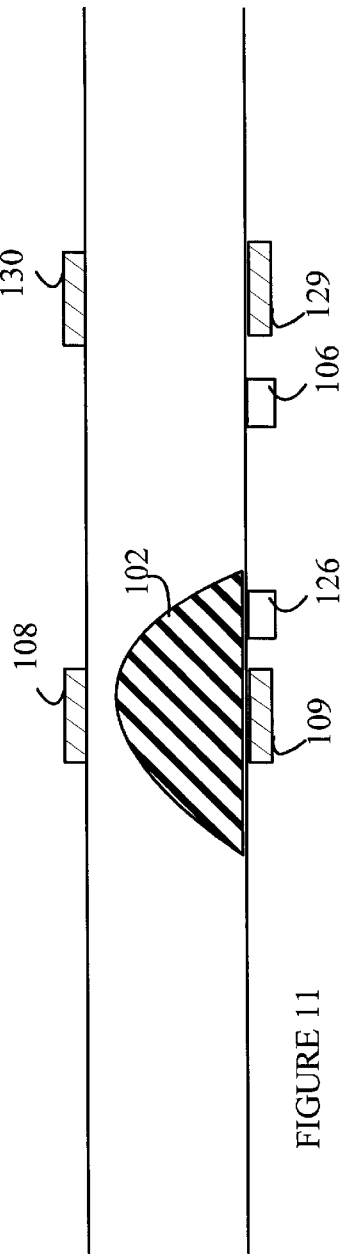

While the above-described embodiments of the present invention utilize electric fields to propel the droplets, other propulsion methods may also be utilized. Consider the case in which the droplet does not wet the walls of the trench as shown in FIGS. 9–11. FIG. 9 is a top cross-sectional view of a trench 101 containing a droplet 102 that moves to match the index of refraction across the gap in waveguide 104. FIGS. 10 and 11 are side cross-sectional views of trench 101 through line 115–116. If the droplet is at a uniform temperature, the surface tension in the surface at the liquid-gas interface 105 is the same as the surface tension at interface 107. If the liquid at interface 105 is now heated, the surface tension will decrease, and the droplet will be subjected to a net force resulting from the difference in surface tension at interfaces 105 and 107. This force will move the droplet toward trench 104. A heating element shown at 106 may be used to heat the droplet edge.

The droplet will continue to move until the edges once again regain thermal equilibrium. Hence, some mechanism must be provided to assure that the droplet stops in a position that covers the gap in waveguide 104. A pair of electrodes 108–109 can be used to stop the droplet by applying a signal across the electrodes to generate an electric field in the desired region. The electrodes may be viewed as forming the plates of a capacitor in which the droplet is the dielectric. The electric field applies a force to the dielectric that holds the dielectric between the plates of the capacitor. This is the force that moved the droplet in the embodiments discussed above. In those embodiments, the droplet was only part of the way into the capacitor, and hence, the force pulled the remaining distance. In this embodiment, the field traps the droplet. Once the droplet has reached thermal equilibrium, the field can be removed.

A second heater 126 can be used to reverse the direction of motion to remove the droplet from the region of the waveguide. A second set of electrodes shown at 129 and 130 can be used to "catch" the droplet and hold it at the reflecting position.

While the above-described embodiment utilized electrodes to create an electric field that will catch the moving droplets, other stop mechanisms can be utilized. For example, mechanical stops made with non-wetting material can be provided as shown in FIG. 12, which is a cross-sectional view of the trench in another embodiment of the present invention. In this embodiment, the motion of droplet 102 is arrested by the stops shown at 132 and 133.

The above-described embodiments of the present invention utilize localized heaters to differentially heat the edges of the droplet; however, other mechanisms can be utilized. Refer now to FIG. 13, which is a cross-sectional view of the trench 151 of another embodiment of the present invention. In this embodiment of the present invention, the cross-point utilizes a droplet that is constructed from a material that has an absorption band at a control wavelength while remaining clear at the wavelength of the light being transmitted through waveguide 104. Hence, if droplet 154 is irradiated with light of the control wavelength from one end, that end of the droplet will be preferentially heated, since the droplet will absorb the light before it reaches the other end of the droplet. The heating can be accomplished by including two small light sources 161 and 162, one at each end of the trench. LEDs or laser diodes can be utilized for these light sources. In the embodiment shown in FIG. 13, pairs of electrodes shown at 171 and 172 are utilized to trap the droplet at the two positions corresponding to the transmitting and reflecting states of the cross-point.

The above-described droplets are generated from a dielectric material that has an index of refraction that matches that of the waveguide. Such materials are well known in the optical arts, and hence, will not be discussed in detail here. Suitable materials are available from Cargille Laboratories, Inc. Scientific Div. 55 Commerce Rd. Cedar Grove, N.J. 07009-1289. It should be noted that an exact match can be obtained by mixing two different dielectric liquids that have different indices of refraction to obtain a droplet having an index of refraction that is intermediate between the component indices.

In embodiments that utilize differential light absorption to heat the droplet edge, any dye that is soluble in the droplet material and provides the desired absorption and transmission bands may be utilized. Suitable dyes are available from Aldrich Chemical and Merck.

The above-described embodiments of the present invention utilize a liquid droplet surrounded by a gas. However, the present invention may be practiced with a vacuum in the trench or with a suspension liquid in the trench provided the liquid has an index of refraction that is sufficiently less than the index of refraction of the liquid in the droplet. In addition, the liquid of the droplet must not be soluble in the suspension liquid. In addition, the dielectric constant of the liquid of the droplet must be greater than that of the suspension liquid if electric fields are utilized to move the droplet or hold the droplet in place.

Various modifications to the present invention will become apparent to those skilled in the art from the foregoing description and accompanying drawings. Accordingly, the present invention is to be limited solely by the scope of the following claims.

What is claimed is:

1. An optical switch comprising:

first and second waveguides having ends disposed across a gap such that light traversing said first waveguide enters said second waveguide when said gap is filled with a liquid having a first index of refraction while light traversing said first waveguide is reflected by said gap when in the absence of said liquid, said gap being part of a wench in a substrate; and a liquid droplet comprising a droplet material having said first index of refraction, said droplet being located in said trench and being movable between first and second positions in said trench, said droplet filling said gap in said first position and said droplet being displaced from said gap in said second position, wherein said droplet has first and second edges disposed laterally across said trench and wherein said optical switch further comprises a first pair of electrodes for applying an electric field across a portion of said liquid droplet including said first edge but not said second edge.

2. The optical switch of claim 1 wherein said trench is filled wit a gas.

3. The optical switch of claim 1 wherein said trench is filled with a liquid having an index of refraction less than said first index of refraction.

4. The optical switch of claim 1 wherein said trench is evacuated.

5. The optical switch of claim 1 further comprising a third waveguide positioned such tat light from said first waveguide is reflected from said gap is reflected into said third waveguide.

6. The optical switch of claim 1 wherein said first pair of electrodes are arranged such that an electrical potential applied between said first pair of electrodes creates an electric field in a region of said trench containing said first position, but not in said region of said trench containing said second position.

7. The optical switch of claim 6 wherein an electrical potential applied between a second pair of electrodes creates an electrical field at a position displaced from said first position, but not in said region of said trench containing said first position.

8. An optical switch comprising:

first and second waveguides having ends disposed across a gap such that light traversing said first waveguide enters said second waveguide when said gap is filled with a liquid having a first index of refraction while light traversing said first waveguide is reflected by said gap when in the absence of said liquid, said gap being part of a trench in a substrate; and a liquid droplet comprising a droplet material having said first index of refraction, said droplet being located in said trench and being movable between first and second positions in said trench, said droplet filling said gap in said first position and said droplet being displaced from said gap in said second position, wherein said droplet has first and second edges disposed laterally across said trench and wherein said optical switch further comprises a heater for differentially heating said first and second edges of said droplet.

9. The optical switch of claim 8 wherein said heater comprises a light source for illuminating said droplet with light of a first wavelength that will be absorbed by said droplet material, said droplet material being transparent to light of a second wavelength that is different from said first wavelength.

10. The optical switch of claim 8 further comprising a plurality of electrodes arranged such that an electrical potential applied between a first pair of said electrodes creates an electric field in a region of said trench containing said first position.

11. An optical switch comprising:

first and second waveguides having ends disposed across a gap such that light traversing said first waveguide enters said second waveguide when said gap is filled with a liquid having a first index of refraction while light traversing said first waveguide is reflected by said gap when in the absence of said liquid, said gag being part of a trench in a substrate; and a liquid droplet comprising a droplet material having said first index of refraction, said droplet being located in said trench and being movable between first and second positions in said trench, said droplet filling said gap in said first position and said droplet being displaced from said gap in said second position, wherein said trench is filled with a gas, and wherein said trench includes a gas passage that allows said gas to move around said droplet when said droplet moves in said trench.

* * * * *